United States Patent [19]

Oomichi et al.

[11] Patent Number: 6,087,285
[45] Date of Patent: Jul. 11, 2000

[54] ZIRCONIA SINTERED BODY, PROCESS FOR PRODUCTION THEREOF, AND APPLICATION THEREOF

[75] Inventors: Nobukatsu Oomichi; Koji Matsui; Akemi Kato; Michiharu Oogai, all of Yamaguchi, Japan

[73] Assignee: Tosoh Corporation, Japan

[21] Appl. No.: 09/168,217

[22] Filed: Oct. 8, 1998

[30] Foreign Application Priority Data

Oct. 13, 1997 [JP] Japan ................................. 9-278925
Oct. 13, 1997 [JP] Japan ................................. 9-278926

[51] Int. Cl.[7] .................................................. C04B 35/48
[52] U.S. Cl. ........................................... 501/103; 501/105
[58] Field of Search ................................. 501/103, 105, 501/152

[56] References Cited

U.S. PATENT DOCUMENTS

| 4,221,650 | 9/1980 | Friese | 501/105 |
|---|---|---|---|
| 4,316,964 | 2/1982 | Lange | 501/105 |
| 4,525,464 | 6/1985 | Claussen et al. | 501/103 |
| 4,690,911 | 9/1987 | Nakada | 501/103 |
| 4,748,138 | 5/1988 | Watanabe et al. | 501/87 |
| 4,853,353 | 8/1989 | Whalen et al. | 501/105 |
| 4,975,397 | 12/1990 | Dworak et al. | 501/105 |
| 5,824,089 | 10/1998 | Rieger | 501/103 |

FOREIGN PATENT DOCUMENTS

| 0036786 | 9/1981 | European Pat. Off. . |
|---|---|---|
| 0036786 A1 | 9/1981 | European Pat. Off. . |

OTHER PUBLICATIONS

Database WPI Week 9708, Derwent Publications LTD. London GB; AN97–083311, XP 002089230 & JP 325057 (Kyocera Corp), Dec. 10, 1996.

Database WPI, Week 9708, Derwent Publications Ltd., London, GB; AN 97–083311, XP002089230 & JP 08 325057 A (Kocera Corp.), Dec. 10, 1996.

*Primary Examiner*—Paul Marcantoni
*Attorney, Agent, or Firm*—Nixon & Vanderhye

[57] ABSTRACT

A novel zirconia sintered body is provided which contains $Y_2O_3$ in a solid solution state, and has tetragonal crystal grains oriented at an orientation degree of not higher than 45%. A process for producing the zirconia sintered body is also provided. This zirconium sintered body deteriorates less, and excellent in stability of surface smoothness, and can be produced by a simple process.

6 Claims, No Drawings

ZIRCONIA SINTERED BODY, PROCESS FOR PRODUCTION THEREOF, AND APPLICATION THEREOF

BACKGROUND OF THE INVENTION

1. Field of the Invention

The present invention relates to a zirconia sintered body having excellent stability of surface smoothness even under hydrothermal conditions. This zirconia sintered body worked precisely is useful widely as precise parts such as optical fiber connector parts (ferrules, split sleeves, etc.), balls for milling machines, pump parts (impellers, casings, mechanical seal sliding rings, bearing balls, sleeves, etc.), semiconductor substrates, biological material parts (artificial bones, artificial joints, etc.), and so forth.

2. Description of the Related Art

The zirconia sintered bodys and the process for production thereof are known. Examples are shown below.

(1) Zirconia ceramics containing $Y_2O_3$ and $ZrO_2$ at a molar ratio ranging from 2/98 to 7/93, constituted of cubic and tetragonal crystal grains having an average particle size of not more than 2 μm, and deteriorating less at a temperature ranging from 200° C. to 300° C. (JP-B-4-63024).

(2) A zirconia sintered body containing 3 to 4 mol % of $Y_2O_3$, constituted of 12 to 40% by volume of a cubic phase as measured by Rietveld method and the balance of tetragonal zirconia, containing $Y_2O_3$ dissolved in a solid state in tetragonal zirconia at a content of not less than 2.3 mol % as derived from the lattice constant, having an average particle size of not more than 0.5 μm, having a relative density of not less than 95%, and forming a transformed layer at 175° C. for 47 hours in a thickness of not more than 30 μm (JP-A-8-325057).

The zirconia sintered body (1) above is produced by calcining a powdery mixture of $ZrO_2$ and $Y_2O_3$, pulverizing the calcined mixture, molding pulverized matter, and sintering the molded article. The resulting zirconia sintered body produced by this process has many monoclinic crystal grains on the surface of the sintered body owing to nonuniformity of the $Y_2O_3$. Such a sintered body, when subjected to a hydrothermal treatment, will deteriorate rapidly from the surface into the interior by tetragonal-monoclinic phase transformation to lose its strength and toughness, becoming unsuitable for applications as a zirconia sintered body. The zirconia sintered body (2) above is produced from a powdery source material having a small specific surface area obtained by co-precipitation by molding and sintering. The resulting zirconia sintered body has a broad crystal grain size distribution, and the surface thereof undergoes readily phase transformation when subjected to a hydrothermal treatment to cause roughness and irregularity of the surface, which is not suitable for applications of the zirconia sintered body.

SUMMARY OF THE INVENTION

An object of the present invention is to provide a zirconia sintered body which undergoes less deterioration into the interior under hydrothermal conditions and is excellent in stability of surface smoothness without disadvantages of the conventional sintered body.

Another object of the present invention is to provide a simplified process for producing the zirconia sintered body.

The embodiments of the zirconia sintered body are as below.

(a) A zirconia sintered body, containing $Y_2O_3$ in a solid solution state, and having tetragonal crystal grains oriented at an orientation degree of not higher than 45%.

(b) The above zirconia sintered body (a), containing $Y_2O_3$ at a concentration ranging from 2 to 8 mol %, and being constituted mainly of tetragonal crystal grains and/or cubic crystal grains.

(c) The above zirconia sintered body (a) or (b), containing $Al_2O_3$ at a concentration ranging from 0.01 to 15% by weight.

(d) The above zirconia sintered body (b) or (c), satisfying the relation between the average crystal grain diameter (D in μm) of the tetragonal phase and/or the cubic phase, and the $Y_2O_3$ concentration (X in mol %): $0<D \leq 0.12X+0.06$.

(e) The above zirconia sintered body (b), (c), or (d), wherein the crystallite in the tetragonal zirconia grains has a diameter of not more than 70 nm, and the crystallite in the cubic zirconia grains has a diameter of not more than 13 nm, and the tetragonal zirconia grains contains $Y_2O_3$ in a solid solution state at a concentration of not less than 2.75 mol %.

(f) The above zirconia sintered body of any of (a) to (e), the ratio of the cubic crystal phase being not higher than 15% by weight.

(g) The above zirconia sintered body any of (a) to (e), having an average surface roughness of not more than 0.007 μm.

(h) A process for producing the zirconia sintered body of any of (a) to (f), comprising molding and sintering fine powdery zirconia containing $Y_2O_3$, containing $Al_2O_3$ at a concentration ranging from 0 to 15% by weight, and having a BET specific surface area ranging from 14 to 17 $m^2/g$, crystalline size ranging from 22 to 30 nm, an average particle size ranging from 0.3 to 0.9 μm, and a monoclinic phase ratio of not higher than 22%.

(i) The above process (h) for producing the zirconia sintered body, wherein the $Y_2O_3$ concentration ranges from 2 to 8 mol %.

DETAILED DESCRIPTION OF THE PREFERRED EMBODIMENT

The inventors of the present invention noticed the fine structure of a zirconia sintered body containing a stabilizer of $Y_2O_3$ etc in a solid solution state, in particular, the crystal structure thereof, and investigated comprehensively change of the state of the surface, and deterioration in the interior caused by a hydrothermal treatment. The present invention has been accomplished on the basis of the result of the investigation.

The present invention is described below in detail.

In the present invention, "$Y_2O_3$ concentration" of the zirconia sintered body is the ratio in mol % of $Y_2O_3/(ZrO_2+Y_2O_3)$; and "$Al_2O_3$ concentration" is the ratio in % by weight of $Al_2O_3/(Al_2O_3+ZrO_2+Y_2O_3)$.

"Orientation degree" of the zirconia crystal grain is a value derived from peak intensities of a (002) plane and a (200) plane of a tetragonal phase in X-ray diffraction measurement according to Equation (1):

$$\text{Orientation degree } (\%) = It(002)/[It(002)+It(200)] \times 100 \quad (1)$$

"Monoclinic phase ratio" is a value derived from the peak intensities of a (111) plane and a (11-1) plane of the monoclinic phase, and the peak intensities of (111) planes of the cubic phase and the tetragonal phase according to Equation (2):

$$\text{Monoclinic phase ratio } (\%) = [Im(111)+Im(11\text{-}1)]/[Im(111)+Im(11\text{-}1)+It(111)+Ic(111)] \times 100 \quad (2)$$

In the equations, I is the peak intensity of each of the reflection, the suffixes m, t, and c indicate respectively a monoclinic phase, a tetragonal phase, and a cubic phase.

"Diameter of the tetragonal zirconia crystallite, and the diameter of the cubic zirconia crystallite" are derived by measuring respectively the half-widths of the peaks of planes of (004), (220), (203), (104), (213), (301), (114), (222), (310), (311), and (302) of the tetragonal phase, and the half-widths of the peaks of planes of (400), (331), and (420) of the cubic phase by utilizing a profile function derived by the Rietveld method (see H. M. Rietveld: J. Appl. Crystallogr., 2, 65- (1969)) with RIETAN94 as the analysis program (see F. Izumi: "The Rietveld Method", Ed. by R. A. Young, Oxford University Press, Oxford (1993), Chap. 13); calculating the diameters according to Equation (3) below, and averaging the calculated values.

$$\text{Crystallite size and Crystalline size} = K\lambda/(\beta \cos \theta) \quad (3)$$

where K is a Schehler's constant (=0.9), X is a wavelength of the measuring X-ray, $\beta$ is a half-width of the peak of the respective planes of the tetragonal phase and the cubic phase corrected by the apparatus constant, and e is a Bragg angle of the peak of the respective planes of the tetragonal phase and the cubic phase (see Japan Chemical Society: "Jikken Kagaku Koza (Library of Experimental Chemistry) 4, Kotai Butsuri Kagaku (Solid physical Chemistry), p. 238–50, Published by Maruzen).

"Concentration of $Y_2O_3$ in the tetragonal zirconia grain in a solid solution state" is the average of the values calculated according to Equations (4) and (5) from the lattice constants of the a-axis and the c-axis determined by the Rietveld method (see R. P. Ingel and D. Lewis III: J. Am. Ceram. Soc., 325–32 (1986)):

$$da \ (nm) = 0.5080 + 0.000349X \quad (4)$$

$$dc \ (nm) = 0.5195 - 0.000309X \quad (5)$$

where da and dc are respectively a lattice constant (nm) of the a-axis and the c-axis of the tetragonal phase, and X is the concentration (mol %) of $YO_{1.5}$.

"Cubic phase ratio" is a value calculated by RIETAN94 as the analysis program (see F. Izumi: "The Rietveld Method", Ed. by R. A. Young, Oxford University Press, Oxford (1993), Chap. 13) according to the Rietveld method.

"Average surface roughness" of the sintered body is derived by measuring dimensions of projection or depression from a central reference level at individual points and averaging the measured dimensions of the projections and depressions. The surface roughness can be measured, for example, by a scanning white-light interferometer.

"Stability of surface smoothness" is evaluated by measuring the change of the average surface roughness before and after a hydrothermal treatment (at 140° C. for 48 hours). The one showing the difference of the roughness before and after the treatment of not more than 0.03 $\mu$m is evaluated to have excellent stability of surface smoothness.

"BET specific surface area" of the fine powdery zirconia is measured by use of nitrogen as the adsorbed molecules.

"Crystalline size" of the powdery zirconia is derived by measuring the half-width of the peak of the (111) plane of the tetragonal phase and calculating according to Equation (3).

"Average particle size" of the powdery zirconia is a diameter of a sphere having the same volume as the grain of the median volume in the grain volume distribution. This can be measured by a laser diffraction apparatus, a centrifugal grain diameter distribution tester, or a like apparatus.

"Monoclinic phase ratio" of the powdery zirconia is derived from the peak intensities of a (111) plane and a (11-1) plane of the monoclinic phase, and the peak intensities of a (111) plane of the cubic phase and the tetragonal phase by calculation according to Equation (2).

The zirconia sintered body of the present invention should essentially contain $Y_2O_3$ in a solid solution state, and the crystal grains of the tetragonal phase of the zirconia sintered body is oriented at an orientation degree of not higher than 45%. At the orientation degree higher than 45% of the crystal grains of the tetragonal phase, the strain in the crystal grain is larger, tending to cause phase transformation to a monoclinic phase. Such a sintered body, when treated hydrothermally, can cause readily phase transformation of the sintered body surface, causing deterioration of the compact from the surface into the interior and increase of the average surface roughness to impair shape of the sintered body. The zirconia sintered body, which contains $Y_2O_3$ at a content ranging from 2 to 8 mol % and is mainly constituted of crystal grains of a tetragonal phase and/or a cubic phase, has excellent stability of the crystal surface smoothness at room temperature and high resistance to hydrothermal conditions. More preferably the yttria is contained at a content ranging from 2.5 to 6 mol %. Naturally, within the aforementioned yttria concentration range, the zirconia sintered body may contain monoclinic crystal grains.

The zirconia sintered body is further improved in hydrothermal resistance by incorporation of $Al_2O_3$ into the zirconia sintered body having the tetragonal crystal grains of the orientation degree of 45% or less, or into the zirconia sintered body having the tetragonal crystal grains of the orientation degree of 45% or less and further containing $Y_2O_3$ at a content of 2 to 8 mol %, because the $Al_2O_3$ increases the force for confining the matrix, and the bonding strength between the grains is increased to improve the grain boundary strength and to retard the tetragonal-monoclinic phase transformation. The alumina concentration is preferably in the range from 0.01 to 15% by weight. The hydrothermal resistance of the zirconia sintered body is still further improved by adjusting, in addition to the above conditions, the $Y_2O_3$ concentration within the range from 2 to 8 mol % and to satisfy the relation (5) below between the average crystal grain diameter D ($\mu$m) of the tetragonal and/or cubic phase and the $Y_2O_3$ concentration X (mol %):

$$0 < D \leq 0.12X + 0.06 \quad (5)$$

because stress-induced transformation, or the tetragonal-monoclinical phase transformation, is suppressed under the above conditions by the critical grain size effect. More preferably, the relation (6) is satisfied:

$$0 < D \leq 0.12X - 0.01 \quad (6)$$

The hydrothermal resistance of the zirconia sintered body is still further improved by incorporating $Al_2O_3$ into the zirconia sintered body satisfying the above relation between the average crystal grain diameter and the yttria concentration, since it suppresses synergistically the tetragonal-monoclinic phase transformation.

The zirconia sintered body satisfying at least one of the above conditions is still further improved in hydrothermal resistance and stability of surface smoothness by adjusting the crystallite size in the tetragonal zirconia grains and the cubic zirconia grains respectively to not more than 70 nm and not more than 13 nm, and adjusting the $Y_2O_3$ concentration in the tetragonal zirconia grains to not less than 2.75 mol % since the distribution of the crystal grain diameter on the sintered body surface is narrowed and the stability of the tetragonal phase is improved thereby. The ratio of cubic phase is preferably not more than 15% by weight.

The surface dimension stability is further improved by controlling the average surface roughness of the entire or at least a part of the sintered body surface to be not more than 0.07 µm, since the surface of the sintered body is made more precise thereby.

In the production of the zirconia sintered body of the present invention, the source material should be fine powdery zirconia containing $Y_2O_3$, containing $Al_2O_3$ at a concentration ranging from 0 to 15% by weight, having a BET specific surface area ranging from 14 to 17 $m^2/g$, having crystalline size ranging from 22 to 30 nm, having an average particle size ranging from 0.3 to 0.9 µm, having a monoclinic phase ratio of not more than 22%, and containing a stabilizer of $Y_2O_3$ etc dissolved therein. Preferably the $Y_2O_3$ concentration ranges from 2 to 8 mol %. A powdery zirconia material which does not satisfy any one or more of the above conditions produces, by molding and sintering under the conditions below, a low-density sintered body, containing tetragonal crystal grains with high strain and large grain diameter. Such sintered body, when treated hydrothermally, undergoes readily phase transformation at the sintered body surface to result in greater average surface roughness and poor shape of the sintered body. Further, by controlling the concentrations of $SiO_2$ and $TiO_2$ in the fine powdery zirconia to be not higher than 0.02% by weight, the zirconia sintered body can be improved more in surface dimension stability and hydrothermal stability.

The aforementioned fine powdery zirconia can be produced by hydrolyzing an aqueous zirconium salt solution to obtain hydrous zirconia sol having an average particle size of from 0.05 to 0.3 µm, mixing it with an yttrium compound, calcining the mixture at a temperature ranging from 800 to 1100° C., and milling the calcined matter. The fine powdery zirconia produced by hydrolysis contains $Y_2O_3$ dissolved uniformly in a solid solution state, and is highly dispersible. Higher uniformity of $Y_2O_3$ in the fine powdery zirconia can be achieved by spray drying the suspension of the hydrous zirconia sol and the yttrium compound in preparation of the mixture of hydrous zirconia sol and $Y_2O_3$. Higher dispersibility of the powdery zirconia is achieved by raising the conversion degree to hydrous zirconia sol up to 90% or higher. When alumina is incorporated, as necessary, into the fine powdery zirconia, the $Al_2O_3$ may directly be mixed to the fine powdery zirconia, or an aluminum compound may be added in any intermediate step before completion of the fine powdery zirconia production.

The molding of fine powdery zirconia can be conducted by a conventional methods such as press molding, injection molding, and extrusion molding. For example, in injection molding, a prescribed amount of an organic binder is added to the powdery material, the mixture is blended uniformly by a blender, and the uniform mixture is injection molded under prescribed conditions into a desired shape to obtain a molded article having a uniform density.

The zirconia sintered body of the present invention is obtained by sintering the above molded article at a temperature ranging from 1200 to 1600° C., preferably from 1200 to 1400° C.

As described above, the zirconia sintered body has exellent stability of the surface smoothness, since the tetragonal-monoclinic phase transfer is suppressed even under hydrothermal conditions. The zirconia sintered body can readily be produced according to the process of the present invention.

The present invention is described specifically by reference to examples without limiting the invention in any way.

In the examples, the zirconia sintered body was produced by molding the powdery zirconia by a metal-mold press under molding pressure of 700 $kgf/cm^2$, and sintering at a prescribed temperature for 2 hours. The surface treatment of the zirconia sintered body was machined by a diamond grinder, and finished by surface polishing. The hydrothermal treatment was conducted by immersion in hot water at 140° C. for 48 hours.

The orientation degree and the monoclinic phase ratio of the zirconia sintered body were derived by conducting X-ray diffraction measurement (2θ=20–90°, step scanning method at 0.040/20 seconds), measuring the peak intensities of the objective diffraction pattern, and calculating according to Equations (1) and (2). The crystallite sizes of the tetragonal phase and the cubic phase were derived by obtaining the half-widths of the objective peaks of the X-ray diffraction according to the profile function derived by the Rietveld method, calculating the value according to Equation (3), and averaging the calculated values. The cubic phase ratio was calculated by Rietveld analysis of the above X-ray diffraction. In the analysis, it was regarded that the measured sample is a mixture of two phase of a tetragonal phase and a cubic phase, the profile functions of the tetragonal phase and the cubic phase are independent from each other, and the temperature parameters of the respective elements were the same. The amount of the $Y_2O_3$ dissolved in the tetragonal zirconia grains as a solid state was derived by averaging the values calculated by Equations (4) and (5) by use of the lattice constants refined by Rietveld analysis.

The average surface roughness (Ra1: before hydrothermal treatment, Ra2: after hydrothermal treatment) was measured by a scanning white-light interferometer. The average crystal grain diameter was calculated by a planimetric method with a scanning electron microscopy. The density of the sintered body was measured according to the Archimedes method. The measurement results are summarized in Tables 1 and 2.

The source material used in the examples was powdery zirconia produced by a hydrolysis process.

EXAMPLE 1

As the source material, powdery zirconia was used which contains $Y_2O_3$ at a concentration of 2 mol %, $Al_2O_3$ at a concentration of 0.2% by weight, $SiO_2$ at a concentration of 0.005% by weight, and $TiO_2$ at a concentration 0.005% by weight; and having a BET specific surface area of 17 $m^2/g$, a crystalline size of 23 nm, an average particle size of 0.6 µm, and a monoclinic phase ratio of 18%. This powdery zirconia was molded and sintered at 1300° C. The resulting sintered body was surface-treated, and was measured for average crystal grain diameter, orientation degree, crystallite sizes in the tetragonal zirconia grain and the cubic zirconia grain, cubic phase ratio, monoclinic phase ratio, density, $Y_2O_3$ concentration in the tetragonal phase, and average surface roughness. This sintered body was kept immersed in hot water at 140° C. for 48 hours, and thereafter the monoclinic phase ratio and the average surface roughness were measured.

EXAMPLE 2

The experiment was conducted in the same manner as in Example 1 except that the powdery zirconia used contained $Y_2O_3$ at a concentration of 3 mol % by weight, and $Al_2O_3$ at a concentration of 0.1% by weight, and had a BET specific surface area of 16 $m^2/g$, a crystalline size of 26 nm, an average particle size of 0.8 µm, and a monoclinic phase ratio of 17%; and the sintering was conducted at a temperature of 1350° C.

EXAMPLE 3

The experiment was conducted in the same manner as in Example 1 except that the powdery zirconia used contained $Y_2O_3$ at a concentration of 3 mol %, and had a BET specific surface area of 16 $m^2/g$, a crystalline size of 26 nm, an average particle size of 0.8 μm, and a monoclinic phase ratio of 17%; and the sintering was conducted at a temperature of 1400° C.

EXAMPLE 4

The experiment was conducted in the same manner as in Example 1 except that the powdery zirconia used contained $Y_2O_3$ at a concentration of 3 mol %, and had a BET specific surface area of 16 m$^2$/g, a crystalline size of 26 nm, an average particle size of 0.8 μm, and a monoclinic phase ratio of 17%; and the sintering was conducted at a temperature of 1350° C.

EXAMPLE 5

The experiment was conducted in the same manner as in Example 1 except that the powdery zirconia used contained $Y_2O_3$ at a concentration of 3 mol %, and $Al_2O_3$ at a concentration of 5.1% by weight, and had a BET specific surface area of 16 m$^2$/g, a crystalline size of 26 nm, an average particle size of 0.8 μm, and a monoclinic phase ratio of 17%; and the sintering was conducted at a temperature of 1400° C.

Comparative Example 1

The experiment was conducted in the same manner as in Example 1 except that the powdery zirconia used contained $Y_2O_3$ at a concentration of 3 mol %, and had a BET specific surface area of 16 m$^2$/g, a crystalline size of 26 nm, an average particle size of 0.8 μm, and a monoclinic phase ratio of 17%; and the sintering was conducted at a temperature of 1500° C.

Comparative Example 2

The experiment was conducted in the same manner as in Example 1 except that the powdery zirconia used contained $Y_2O_3$ at a concentration of 3 mol %, and $Al_2O_3$ at a concentration of 0.005% by weight, and had a BET specific surface area of 15 m$^2$/g, a crystalline size of 27 nm, an average particle size of 0.7 μm, and a monoclinic phase ratio of 17%; and the sintering was conducted at a temperature of 1500° C.

EXAMPLE 6

The experiment was conducted in the same manner as in Example 1 except that the powdery zirconia used contained $Y_2O_3$ at a concentration of 3 mol %, and had a BET specific surface area of 16 m$^2$/g, a crystalline size of 26 nm, an average particle size of 0.8 μm, and a monoclinic phase ratio of 17%; and the sintering was conducted at a temperature of 1450° C.

EXAMPLE 7

The experiment was conducted in the same manner as in Example 1 except that the powdery zirconia used contained $Y_2O_3$ at a concentration of 3.5 mol % by weight, and $Al_2O_3$ at a concentration of 0.2%, and had a BET specific surface area of 14 m$^2$/g, a crystalline size of 28 nm, an average particle size of 0.7 μm, and a monoclinic phase ratio of 10%; and the sintering was conducted at a temperature of 1400° C.

EXAMPLE 8

The experiment was conducted in the same manner as in Example 1 except that the powdery zirconia used contained $Y_2O_3$ at a concentration of 3 mol %, and had a BET specific surface area of 16 m$^2$/g, a crystalline size of 26 nm, an average particle size of 0.8 μm, and a monoclinic phase ratio of 17%; and the sintering was conducted at a temperature of 1300° C.

EXAMPLE 9

The experiment was conducted in the same manner as in Example 1 except that the powdery zirconia used contained $Y_2O_3$ at a concentration of 3.5 mol %, and $Al_2O_3$ at a concentration of 0.2% by weight, and had a BET specific surface area of 14 m$^2$/g, a crystalline size of 28 nm, an average particle size of 0.7 μm, and a monoclinic phase ratio of 10%; and the sintering was conducted at a temperature of 1350° C.

EXAMPLE 10

The experiment was conducted in the same manner as in Example 1 except that the powdery zirconia used contained $Y_2O_3$ at a concentration of 3.5 mol %, and $Al_2O_3$ at a concentration of 0.2% by weight, and had a BET specific surface area of 14 m$^2$/g, a crystalline size of 28 nm, an average particle size of 0.7 μm, and a monoclinic phase ratio of 10%; and the sintering was conducted at a temperature of 1300° C.

Comparative Example 3

From $ZrO_2$ (commercial product), $Y_2O_3$ (commercial product), and $Al_2O_3$ (commercial product) as the source materials, powdery zirconia was prepared by a solid phase mixing process. The resulting powdery zirconia contained $Y_2O_3$ at a concentration of 3 mol %, and $Al_2O_3$ at a concentration of 0.3% by weight, and had a BET specific surface area of 14 m$^2$/g, a crystalline size of 40 nm, an average particle size of 1.5 μm, and a monoclinic phase ratio of 100%. This powdery zirconia was molded, and sintered at 1500° C. The resulting sintered body, after surface treatment, was measured for average crystal grain diameter, orientation degree, cubic phase ratio, monoclinic phase ratio, density, and average surface roughness. This sintered body was immersed in a hot water at 140° C. for 48 hours, and subjected to measurement of the monoclinic phase ratio and the surface roughness.

Comparative Example 4

The experiment was conducted in the same manner as in Comparative Example 1 except that the powdery zirconia was a commercial product produced by a co-precipitation process, containing $Y_2O_3$ at a concentration of 3 mol %, a BET specific surface area of 8 m$^2$/g, a crystalline size of 47 nm, an average particle size of 0.7 μm, and a monoclinic phase ratio of 30%.

TABLE 1

Powder Properties

| | $Y_2O_3$ (mol %) | $Al_2O_3$ (wt %) | $SiO_2$ (wt %) | $TiO_2$ (wt %) | BET specific surface area ($m^2/g$) | Crystalline size (nm) | Average particle size ($\mu m$) | Monoclinic phase ratio (%) | Sintering temperature (° C.) |
|---|---|---|---|---|---|---|---|---|---|
| Example | | | | | | | | | |
| 1 | 2 | 0.2 | 0.005 | 0.005 | 17 | 23 | 0.6 | 18 | 1300 |
| 2 | 3 | 0.1 | 0.005 | 0.005 | 16 | 26 | 0.8 | 17 | 1350 |
| 3 | 3 | 0.2 | 0.005 | 0.005 | 16 | 26 | 0.8 | 17 | 1400 |
| 4 | 3 | 0.2 | 0.005 | 0.005 | 16 | 26 | 0.8 | 17 | 1350 |
| 5 | 3 | 5.1 | 0.005 | 0.005 | 16 | 26 | 0.8 | 17 | 1400 |
| 6 | 3 | 0.2 | 0.005 | 0.005 | 16 | 26 | 0.8 | 17 | 1500 |
| 7 | 3 | 0.005 | 0.005 | 0.005 | 15 | 27 | 0.7 | 17 | 1500 |
| 8 | 3 | 0.2 | 0.005 | 0.005 | 16 | 26 | 0.8 | 17 | 1450 |
| 9 | 3.5 | 0.2 | 0.005 | 0.005 | 14 | 28 | 0.7 | 10 | 1400 |
| 10 | 3 | 0.2 | 0.005 | 0.005 | 16 | 26 | 0.8 | 17 | 1300 |
| 11 | 3.5 | 0.2 | 0.005 | 0.005 | 14 | 28 | 0.7 | 10 | 1350 |
| 12 | 3.5 | 0.2 | 0.005 | 0.005 | 14 | 28 | 0.7 | 10 | 1300 |
| Comparative Example | | | | | | | | | |
| 1 | 3 | 0.3 | 0.010 | 0.010 | 14 | 40 | 1.5 | 100 | 1500 |
| 2 | 3 | 0.3 | 0.135 | 0.110 | 8 | 47 | 0.7 | 30 | 1500 |

TABLE 2

Properties of Sintered Body before and after Hydrothermal Treatment

| | | | | | | Before Hydrothermal Treatment | | | |
|---|---|---|---|---|---|---|---|---|---|
| | Grain Diameter (%)→($\mu m$) | Orientation degree (%) | Crystallite size (tetragonal phase) (nm) | Crystallite size (Cubic phase) (nm) | Cubic phase ratio (%) | Monoclinic phase ratio (%) | $Y_2O_3$ concentration in tetragonal phase (mol %) | Density (g/cm³) | Ra1 ($\mu m$) |
| Example 1 | | | | | | | | | |
| 1 | 0.23 | 40 | | | | 0 | | 6.03 | 0.0011 |
| 2 | 0.28 | 42 | | | | 0 | | 6.01 | 0.0012 |
| 3 | 0.34 | 43 | 73 | 13 | 16 | 0 | | 6.06 | 0.0011 |
| 4 | 0.27 | 42 | 62 | 10 | 14 | 0 | 2.90 | 6.04 | 0.0012 |
| 5 | 0.34 | 44 | | | 23 | 0 | | 5.89 | 0.0012 |
| 6 | 0.41 | 40 | | | 17 | | | 6.06 | 0.0012 |
| 7 | 0.36 | 39 | | | | 0 | | 6.05 | 0.0010 |
| 8 | 0.24 | 39 | 58 | 7 | 12 | 0 | 3.05 | 6.00 | 0.0011 |
| 9 | 0.29 | 39 | 65 | 11 | 15 | 0 | | 6.04 | 0.0011 |
| 10 | 0.24 | 39 | 60 | 9 | 13 | 0 | | 6.01 | 0.0011 |
| Comparative Example | | | | | | | | | |
| 1 | 0.55 | 41 | 114 | 18 | | 0 | | 6.07 | 0.0011 |
| 2 | 0.55 | 39 | 112 | 18 | 18 | 0 | 2.54 | 6.08 | 0.0011 |
| 3 | 0.5–5 | 56 | 45 | 3 | | 5.88 | 0.0113 | | |
| 4 | 0.6–4 | 52 | 150 | 20 | 31 | 0 | | 6.02 | 0.0102 |

| | After Hydrothermal Treatment | | |
|---|---|---|---|
| | Monoclinic phase ratio (%) | Ra2 ($\mu m$) | Ra2-Ra1 ($\mu m$) |
| Example | | | |
| 1 | 2 | 0.0015 | 0.0004 |
| 2 | 3 | 0.0035 | 0.0023 |
| 3 | 32 | 0.0080 | 0.0069 |
| 4 | 2 | 0.0031 | 0.0019 |
| 5 | 18 | 0.0068 | 0.0055 |
| 6 | 40 | 0.0113 | 0.0101 |
| 7 | 5 | 0.0032 | 0.0022 |
| 8 | 0 | 0.0012 | 0.0001 |
| 9 | 0 | 0.0012 | 0.0001 |
| 10 | 0 | 0.0012 | 0.0001 |

TABLE 2-continued

Properties of Sintered Body before and after Hydrothermal Treatment

| Comparative Example | | | |
|---|---|---|---|
| 1 | 48 | 0.0125 | 0.0136 |
| 2 | 61 | 0.0291 | 0.0280 |
| 3 | 26 | 0.0613 | 0.00660 |
| 4 | 31 | 0.0517 | 0.0415 |

The grain diameters of Comparative Examples 1 and 2 show that the textures were constituted of large grains and small grains mixedly.
Tables 1 and 2 show that the zirconia sintered compacts of Examples 1–12 have excellent properties in comparison with the ones of Comparative Examples 1 and 2.

What is claimed is:

1. A zirconia sintered body, containing $Y_2O_3$ at a concentration ranging from 2 to 3.5 mol % in a solid solution state, consisting essentially of tetragonal crystal grains and cubic crystals, said tetragonal crystal grains oriented at an orientation degree of not higher than 45%, wherein the average crystal grain diameter (D in $\mu$m) of the tetragonal phase or the cubic phase and the concentration of $Y_2O_3$ (X in mol %) satisfy the relation: $0<D<0.12X+0.06$.

2. The zirconia sintered body according to claim 1, which contains $Al_2O_3$ at a concentration ranging from 0.01 to 5.1% by weight.

3. The zirconia sintered body according to claim 1, wherein the crystallite in the tetragonal zirconia grains has a diameter of not more than 70 nm, and the crystallite in the cubic zirconia grains has a diameter of not more than 13 nm, and the tetragonal zirconia grains contains $Y_2O_3$ in a solid solution state at a concentration of not less than 2.75 mol %.

4. The zirconia sintered body according to claim 1, wherein the ratio of the cubic crystal phase is not higher than 15% by weight.

5. The zirconia sintered body according to claim 1, which has an average surface roughness of not more than 0.007 $\mu$m.

6. A process for producing the zirconia sintered body of any of claims 1 to 4, comprising molding and sintering fine powdery zirconia containing 2 to 3.5 mol % $Y_2O_3$, $Al_2O_3$ at a concentration ranging from 0 to 5.1% by weight, and having a BET specific surface area ranging from 14 to 17 $m^2/g$, a crystalline size ranging from 22 to 30 nm, an average particle size ranging from 0.3 to 0.9 $\mu$m, and a monoclinic phase ratio of not higher than 22%.

\* \* \* \* \*